United States Patent
Bernhardt et al.

(10) Patent No.: US 9,878,777 B2
(45) Date of Patent: Jan. 30, 2018

(54) METHODS OF DYNAMICALLY CONTROLLING AIRFLOW BEHIND A CARRIER AIRCRAFT TO REDIRECT AIR FLOW DURING AN IN-FLIGHT RECOVERY OF AN UNMANNED AERIAL VEHICLE AND AN APPARATUS THEREFOR

(71) Applicant: The Boeing Company, Chicago, IL (US)

(72) Inventors: Roger D. Bernhardt, St. Charles, MO (US); Alexander D. Lee, St. Peters, MO (US); Ryan L. Hupp, Creve Coeur, MO (US); Abraham N. Gissen, Brentwood, MO (US); Benjamin A. Rothacker, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 15/166,732

(22) Filed: May 27, 2016

(65) Prior Publication Data
US 2017/0341735 A1 Nov. 30, 2017

(51) Int. Cl.
*B64C 21/04* (2006.01)
*B64C 23/00* (2006.01)
*B64C 19/00* (2006.01)

(52) U.S. Cl.
CPC .............. *B64C 21/04* (2013.01); *B64C 19/00* (2013.01); *B64C 23/00* (2013.01); *B64C 2201/182* (2013.01)

(58) Field of Classification Search
CPC ......... B64C 21/04; B64C 19/00; B64C 23/00; B64C 2201/182
See application file for complete search history.

(56) References Cited

U.S. PATENT DOCUMENTS

| 2,813,719 | A | 11/1957 | Hopper |
| 5,016,818 | A | 5/1991 | Nash et al. |
| 7,472,868 | B2 | 1/2009 | Schuster et al. |

(Continued)

FOREIGN PATENT DOCUMENTS

| GB | 942 339 | 11/1963 |
| GB | 2 469 613 | 10/2010 |
| WO | WO 02/076826 | 10/2002 |

OTHER PUBLICATIONS

European Patent Office, Extended European Search Report, EP 17 17 2934 (dated Jul. 28, 2017).

*Primary Examiner* — Aaron L Troost
(74) *Attorney, Agent, or Firm* — Walters & Wasylyna LLC

(57) ABSTRACT

An apparatus is provided for dynamically controlling airflow behind a carrier aircraft to redirect air flow during an in-flight recovery of an unmanned aerial vehicle (UAV). The apparatus comprises a frame attached to an end portion of an arm member extending from the carrier aircraft. The apparatus comprises a plurality of vanes disposed within the frame. Each vane is controllable between an opened position and a closed position to dynamically modify the airflow behind the carrier aircraft during the in-flight recovery of the UAV. Alternatively, or in addition to, the apparatus comprises a plurality of compressed air jets disposed on the frame, wherein each jet is controllable to provide active airflow to dynamically modify the airflow behind the carrier aircraft during the in-flight recovery of the UAV.

20 Claims, 13 Drawing Sheets

(56) References Cited

U.S. PATENT DOCUMENTS

| | | | |
|---|---|---|---|
| 8,220,746 B1* | 7/2012 | Stecko | B64D 39/06 |
| | | | 244/110 R |
| 2004/0089767 A1* | 5/2004 | Harrison | B64C 39/024 |
| | | | 244/137.4 |
| 2010/0282913 A1* | 11/2010 | Mouskis | B64D 39/00 |
| | | | 244/135 A |
| 2011/0006151 A1 | 1/2011 | Beard | |
| 2012/0318929 A1 | 12/2012 | Golling | |
| 2013/0168497 A1* | 7/2013 | Rix | B64D 39/00 |
| | | | 244/135 A |

* cited by examiner

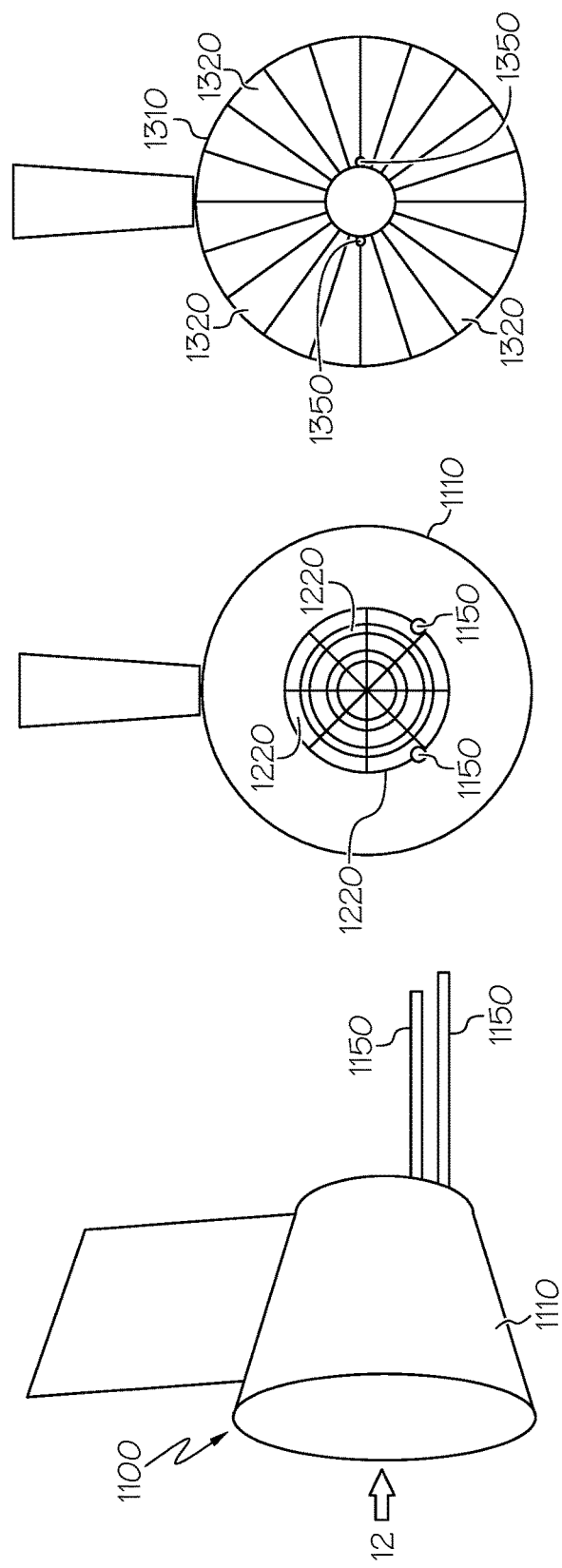

METHODS OF DYNAMICALLY CONTROLLING AIRFLOW BEHIND A CARRIER AIRCRAFT TO REDIRECT AIR FLOW DURING AN IN-FLIGHT RECOVERY OF AN UNMANNED AERIAL VEHICLE AND AN APPARATUS THEREFOR

FIELD

The present application relates to recovery of unmanned aerial vehicles, and is particularly directed to methods of dynamically controlling airflow behind a carrier aircraft to redirect air flow during an in-flight recovery of an unmanned aerial vehicle (UAV) and an apparatus therefor.

BACKGROUND

During recovery of a UAV by a carrier aircraft, air turbulence behind the carrier aircraft could cause unpredictable and unstable behaviors of the UAV. Behavior of the UAV tends to become more unpredictable and more unstable as the UAV moves closer and closer to the carrier aircraft as the UAV is being recovered. It would be desirable to locally control the air flow/direction behind the carrier aircraft during recovery of a UAV.

SUMMARY

In one aspect, an apparatus is provided for dynamically controlling airflow behind a carrier aircraft to redirect air flow during an in-flight recovery of an unmanned aerial vehicle (UAV). The apparatus comprises a frame attached to an end portion of an arm member extending from the carrier aircraft. The apparatus comprises a plurality of vanes disposed within the frame. Each vane is controllable between an opened position and a closed position to dynamically modify the airflow behind the carrier aircraft during the in-flight recovery of the UAV.

In another aspect, an apparatus is provided for dynamically controlling airflow behind a carrier aircraft to redirect air flow during an in-flight recovery of an unmanned aerial vehicle (UAV). The apparatus comprises a frame attached to an end portion of the arm member extending from the carrier aircraft. The apparatus comprises a plurality of compressed air jets disposed on the frame, wherein each jet is controllable to provide active airflow to dynamically modify the airflow behind the carrier aircraft during the in-flight recovery of the UAV.

In yet another aspect, a method is provided of dynamically controlling airflow behind a carrier aircraft to redirect air flow during an in-flight recovery of an unmanned aerial vehicle (UAV). The method comprises controlling each vane of a plurality of vanes between an opened position and a closed position to dynamically modify the airflow behind the carrier aircraft during the in-flight recovery of the UAV.

In still another aspect, a method is provided of dynamically controlling airflow behind a carrier aircraft to redirect air flow during an in-flight recovery of an unmanned aerial vehicle (UAV). The method comprises controlling each jet of a plurality of compressed air jets to provide active airflow to dynamically modify the airflow behind the carrier aircraft during the in-flight recovery of the UAV.

Other aspects will become apparent from the following detailed description, the accompanying drawings and the appended claims.

BRIEF DESCRIPTION OF THE DRAWINGS

FIG. 11 is an elevational view of an example airflow control apparatus for dynamically controlling airflow behind a carrier aircraft, and constructed in accordance with yet another embodiment.

FIG. 12 is an elevational view, looking approximately in the direction of arrow "12" in FIG. 11, and showing controllable, arcuate-shaped vanes in closed positions.

FIG. 13 is an elevational view similar to the perspective view of FIG. 12, and showing controllable, radial-shaped vanes in closed positions, in accordance with another embodiment.

DETAILED DESCRIPTION

The present application is directed to methods of dynamically controlling airflow behind a carrier aircraft to redirect air flow during an in-flight recovery of an unmanned aerial vehicle (UAV) and an apparatus therefor. The specific construction of the airflow control apparatus for controlling airflow behind a carrier aircraft and the specific application (e.g., military or commercial) in which the methods are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes an airflow control apparatus and methods implemented for dynamically controlling airflow behind a carrier aircraft to redirect air flow during an in-flight recovery of a UAV in compliance with Federal Aviation Administration (FAA) regulations. Air turbulence is modified when air flow is redirected.

Figure 1:
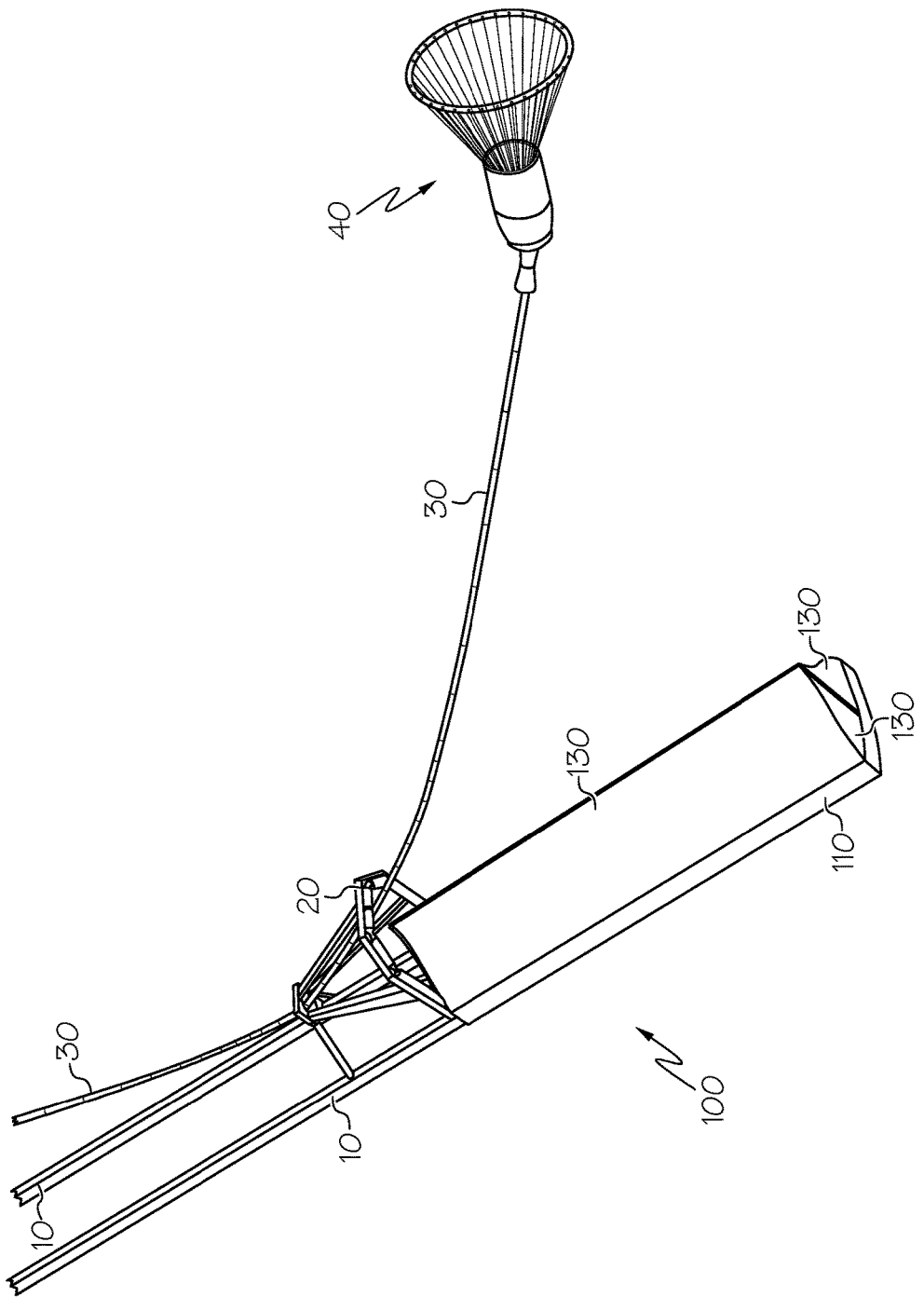
FIG. 1 is a perspective view of an example airflow control apparatus for dynamically controlling airflow behind a carrier aircraft, and constructed in accordance with an embodiment.
Figure 2:
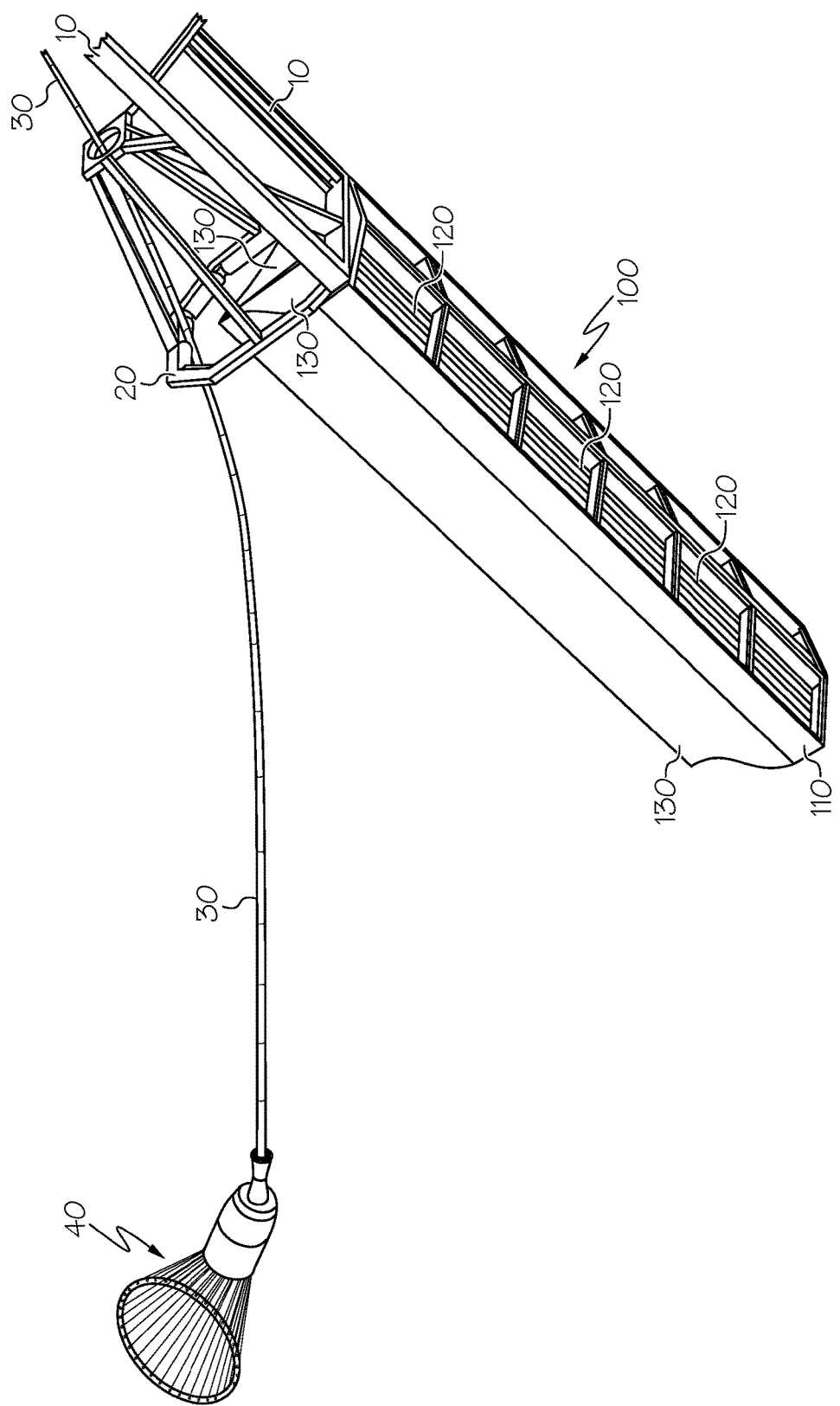
FIG. 2 is a perspective view, looking approximately out of the page of FIG. 1 and from the opposite side of the airflow control apparatus, and showing controllable doors fully closed and controllable vanes fully closed.

FIG. 1 illustrates a perspective view of an example airflow control apparatus 100 for dynamically controlling airflow behind a carrier aircraft in accordance with an embodiment. FIG. 2 is a perspective view, looking approximately out of the page of FIG. 1 and from the opposite side of airflow control apparatus 100. Known existing structures for recovering (i.e., capturing and securing) a UAV can be modified to embody airflow control apparatus 100. For example, as shown in FIGS. 1 and 2, an arm member 10 is extended from behind a carrier aircraft (not shown) during recovery of a UAV (also not shown). A recovery carriage in the form of enclosing "cage" structure 20 is disposed at the end of arm member 10, and is nested within the arm member 10. A tether 30 from behind the carrier aircraft extends alongside the arm member 10 and through cage structure 20 into the air stream behind the carrier aircraft.

A coupling structure 40 is attached to the end of tether 30. Coupling structure 40 may comprise a funnel-shaped device attached to the end of the tether 30. For example, coupling structure 40 may comprise a refueling drogue. Other types of coupling structures are possible. Coupling structure 40 interlocks with an associated coupling structure (not shown) mounted on the UAV. Structure and operation of various types of interlocking coupling structures are known and, therefore, will not be described.

Airflow control apparatus 100 includes a frame 110 attached to the end portion of arm member 10 where cage structure 20 is disposed. Airflow control apparatus 100 further includes a plurality of vanes 120 (FIG. 2) disposed within frame 110. Controllable vanes of the plurality of vanes 120 shown in FIG. 2 are fully closed.

Airflow control apparatus 100 also includes a plurality of doors 130 disposed on frame 110. Each door of the plurality of doors 130 is controllable between an opened (e.g., deployed) position and a closed (e.g., stowed) position. Controllable doors of the plurality of doors 130 shown in FIG. 2 (and FIG. 1) are fully closed. Also, each door of the plurality of doors 130 is controllable between an opened position and a closed position to dynamically modify the airflow behind the carrier aircraft and thereby to redirect air flow during the in-flight recovery of the UAV.

Airflow control apparatus 100 is provided for dynamically controlling airflow behind the carrier aircraft to redirect air flow during an in-flight recovery of the UAV. More specifically, each vane of the plurality of vanes 120 is controllable between an opened position and a closed position to dynamically modify the airflow behind the carrier aircraft and thereby to redirect air flow during the in-flight recovery of the UAV.

As shown in FIGS. 1 and 2, frame 110 is rectangular-shaped. Each vane of the plurality of vanes 120 is rectangular-shaped, and each door of the plurality of doors 130 is also rectangular-shaped. Other shapes of frames, shapes of vanes, shapes of doors, or any combination thereof are possible.

Figure 3:
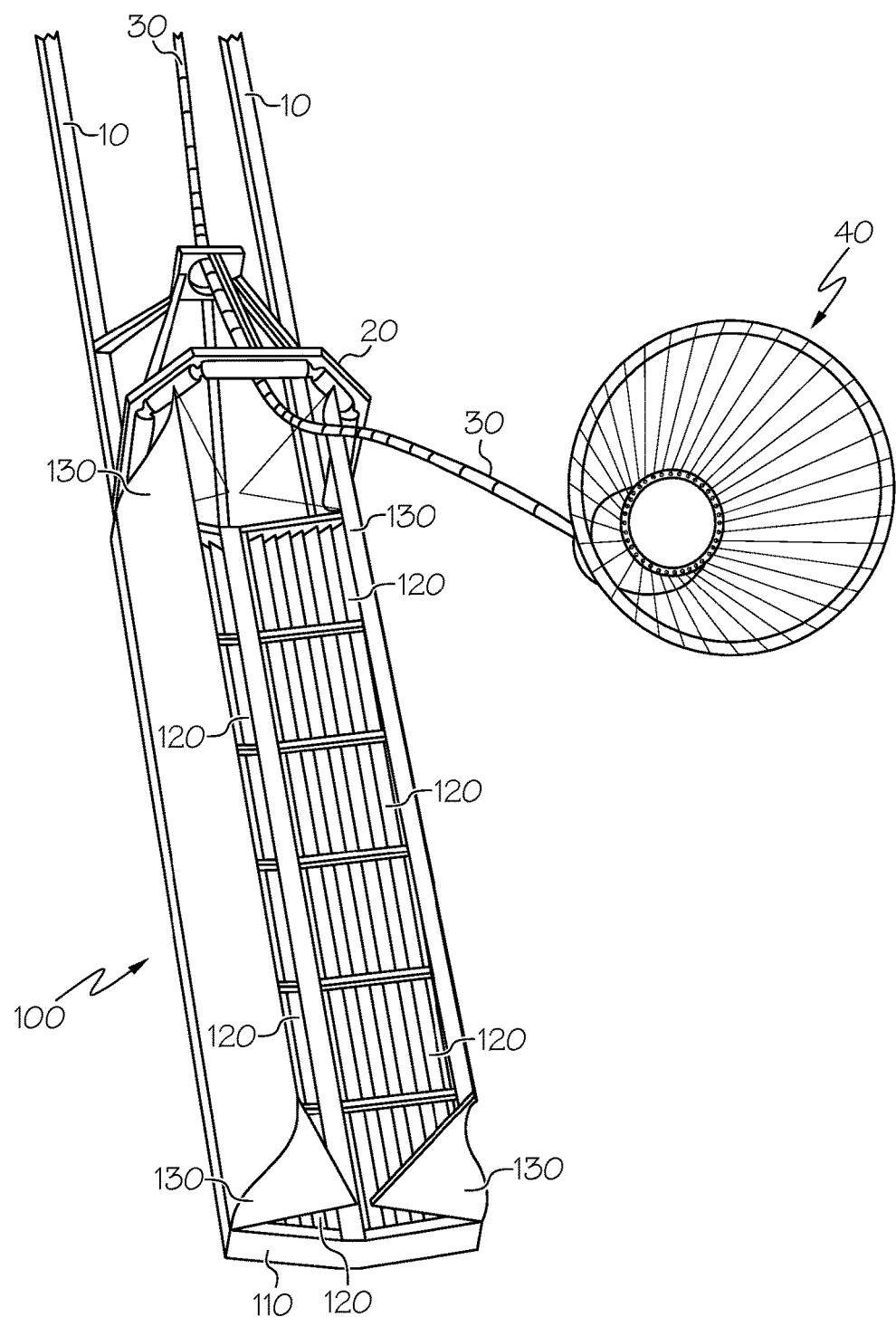
FIG. 3 is a perspective view similar to the perspective view of FIG. 1 from a slightly different angle, and showing controllable doors partially opened and controllable vanes mostly closed.

Referring to FIG. 3, a perspective view similar to the perspective view of FIG. 1 from a slightly different angle, is illustrated. In FIG. 3, the UAV (not shown) makes initial contact with coupling structure 40 at a far-off distance, and the plurality of doors 130 and the plurality of vanes 120 begin to open. FIG. 3 shows each door of the plurality of doors 130 mostly (i.e., partially) opened and each vane of the plurality of vanes 120 fully closed. The plurality of doors 130 begin to open more and more as the UAV attached to coupling structure 40 moves closer and closer to frame 110 as the UAV is being reeled in by tether 30.

Figure 4:
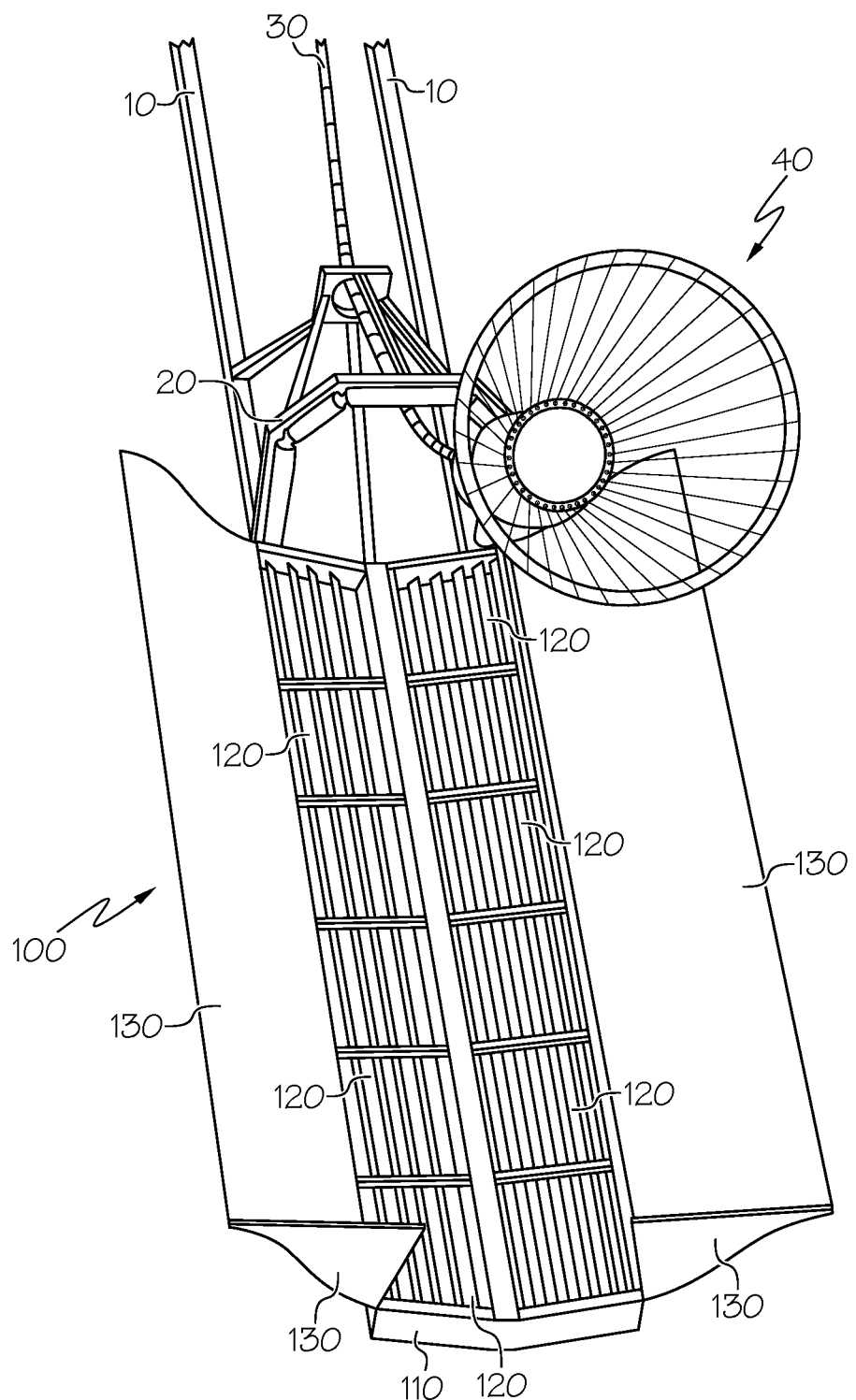
FIG. 4 is a perspective view similar to the perspective view of FIG. 3, and showing the controllable doors fully opened and the controllable vanes mostly opened.

Referring to FIG. 4, a perspective view similar to the perspective view of FIG. 3 is illustrated. In FIG. 4, the UAV is in close proximity to airflow control apparatus 100 and is within "range of effect" of airflow control apparatus 100. More specifically, FIG. 4 shows the controllable doors of the plurality of doors 130 mostly opened (e.g., almost 100% opened) with some dynamic actuation to control airflow. The controllable vanes of the plurality of vanes 120 are mostly closed and actuating under control signals from a controller of a computer system using information provided by a number of relative position and orientation sensors, as will be described in more detail hereinbelow. Coupling structure 40 (and therefore the UAV) shown in the position of FIG. 4 is closer to airflow control apparatus 100 than shown in the position of FIG. 3.

Figure 5:
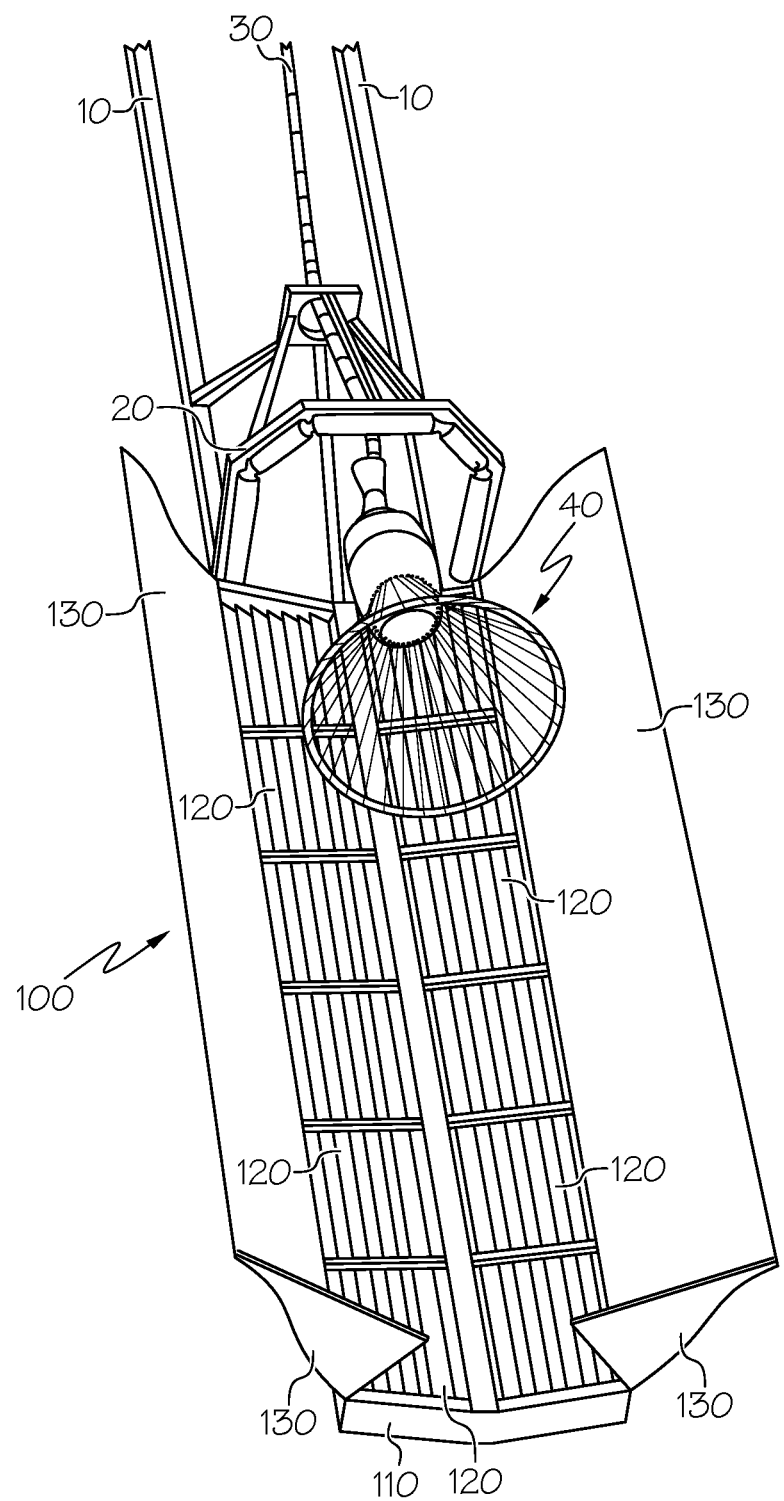
FIG. 5 is a perspective view similar to the perspective view of FIG. 4, and showing the controllable vanes mostly closed and a coupling structure in a different position.

Referring to FIG. 5, a perspective view similar to the perspective view of FIG. 4 is illustrated. In FIG. 5, the UAV makes contact with airflow control apparatus 100. More specifically, FIG. 5 shows each door of the plurality of doors 130 in a mostly opened position, and each vane of the plurality of vanes 120 in a fully closed position (i.e., 100% closed off). FIG. 5 also shows coupling structure 40 in a position that is even closer to airflow control apparatus 100 than shown in the position of FIG. 4. As coupling structure 40 moves closer to airflow control apparatus 100 from the position shown in FIG. 4 to the position shown in FIG. 5, each vane of the plurality of vanes 120 can be controlled to move anywhere between its fully opened position and its fully closed position. Moreover, each door of the plurality of doors 130 can be controlled to move anywhere between its fully opened position and its fully opened position.

After the UAV makes contact with airflow control apparatus 100 in FIG. 5 and lands, the doors of the plurality of doors 130 begin to close on the UAV to secure the UAV in all six degrees of freedom. When the doors of the plurality of doors 130 are fully closed, the UAV is secured and both the UAV and coupling structure 40 are trapped inside airflow control apparatus 100.

Figure 6:
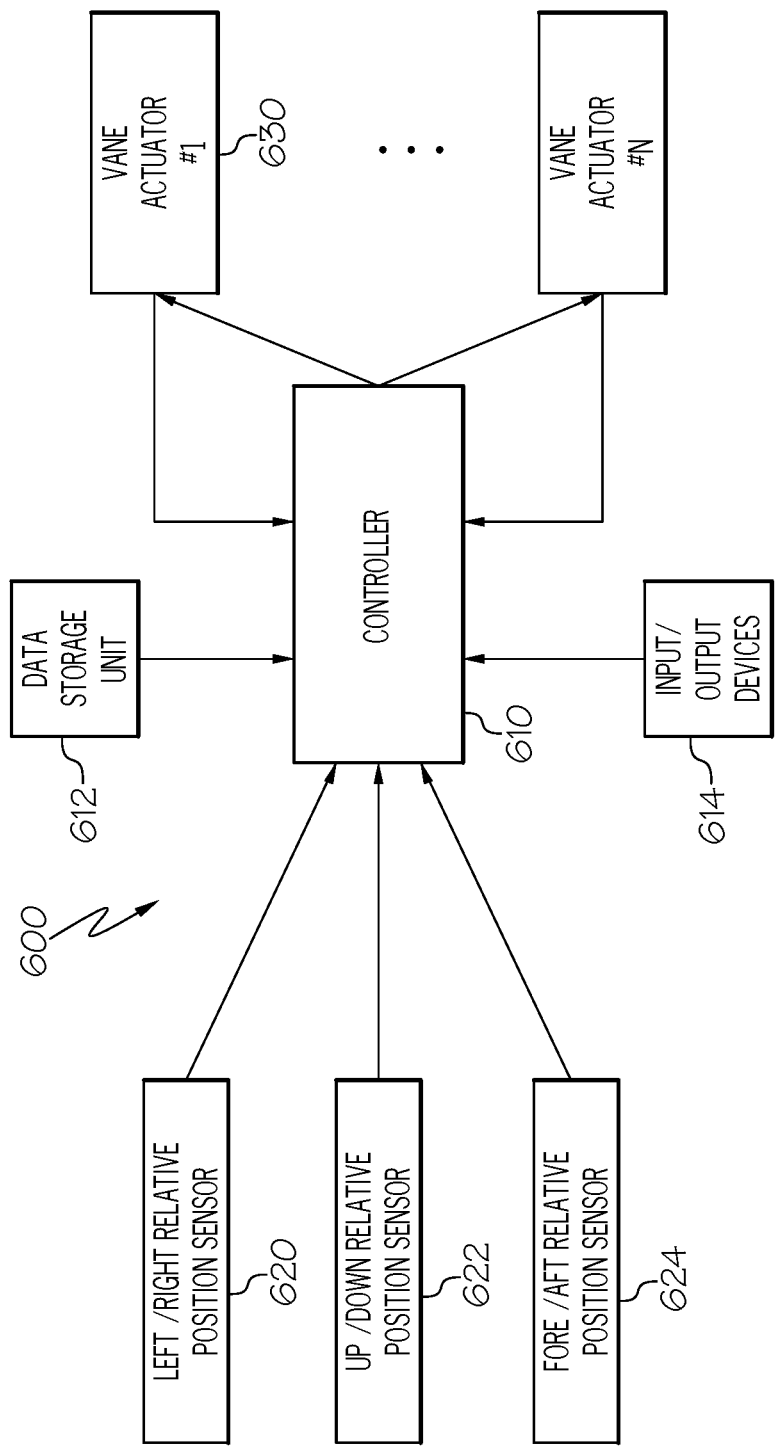
FIG. 6 shows an example computer system capable of controlling vanes, doors, or any combination thereof, in accordance with an embodiment.

Referring to FIG. 6, an example computer system 600 capable of controlling a number of vanes, a number of doors, or any combination thereof, in accordance with an embodiment, is illustrated. Computer system 600 includes controller 610 that executes instructions stored in data storage unit 612. Processing unit 610 may comprise any type of technology. For example, processing unit 610 may comprise a general-purpose electronic processor. Alternatively, processing unit 610 may comprise a dedicated-purpose electronic processor. Other types of processors and processing unit technologies are possible.

Data storage unit 612 may comprise any type of technology. For examples, data storage unit 612 may comprise random access memory (RAM), read only memory (ROM), solid state memory, or any combination thereof. Other types of memories and data storage unit technologies are possible.

Computer system 600 further includes a number of input/output (I/O) devices 614 that may comprise any type of technology. For example, I/O devices 614 may comprise a keypad, a keyboard, a touch-sensitive display screen, a liquid crystal display (LCD) screen, a microphone, a speaker, or any combination thereof. Other types of I/O devices and technologies are possible Each of controller 610, data storage unit 612, and I/O devices 614 can be mounted on arm member 10, cage structure 20, frame 110, any one or more of the plurality of vanes 120, any one or more of the plurality of doors 130, the carrier aircraft, the UAV, or any combination thereof. Other mounting locations of each of controller 610, data storage unit 612, and I/O devices 614 are possible.

Computer system 600 further comprises a number of relative position sensors including, for example, one or more left/right position sensors 620, one or more up/down position sensors 622, and one or more fore/aft sensors 624. Each of sensors 620, 622, 624 can be mounted on arm member 10, cage structure 20, frame 110, any one or more of the plurality of vanes 120, any one or more of the plurality of doors 130, the carrier aircraft, the UAV, or any combination thereof. Other mounting locations of each of one or more sensors 620, 622, 624 is possible.

Computer system 600 also comprises a number of vane actuators 630. As shown in FIG. 6, "N" number of vane actuators is shown. Each vane of vane actuators 630 is operatively connected to one or more vanes of the plurality of vanes 120. For example, all vanes of the plurality of vanes 120 may be operatively connected to only one vane actuator 630. As another example, all vanes on one side (e.g., the left side) of frame 110 may be operatively connected to one vane actuator 630, and all vanes on the opposite side (i.e., the right side) of frame 110 may be operatively connected to another vane actuator 630. As yet another example, each vane of the plurality of vanes 120 may be operatively connected to a respective, individual vane actuator 630.

Controller 610 is responsive to signals from the number of sensors 620, 622, 624 to control opening and closing of the plurality of doors 130. Controller 610 is also responsive to signals from the number of sensors 620, 622, 624 to control the number of vane actuators 630 to control opening and closing of the plurality of vanes 120. More specifically, controller 610 executes instructions stored in data storage unit 612 in response to signals from the number of sensors 620, 622, 624 to control opening and closing of the plurality of doors 130 and to control opening and closing of the plurality of vanes 120 to dynamically modify the airflow behind the carrier aircraft and thereby to redirect air flow during the in-flight recovery of the UAV.

Figure 7:
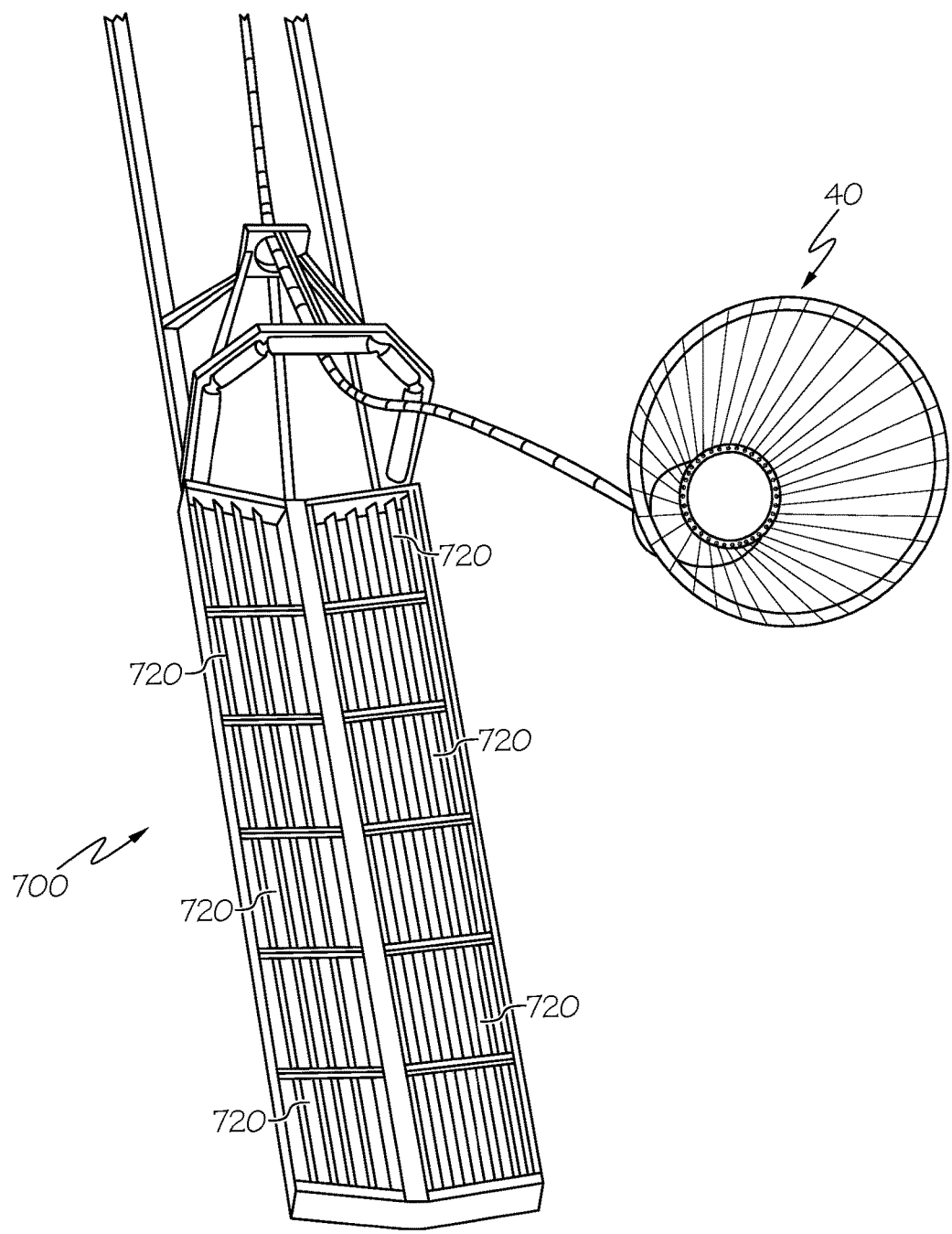
FIG. 7 is a perspective view of an example airflow control apparatus for dynamically controlling airflow behind a carrier aircraft, and constructed in accordance with another embodiment.

Referring to FIG. 7, a perspective view of an example airflow control apparatus 700 for dynamically controlling airflow behind a carrier aircraft, and constructed in accordance with another embodiment, is illustrated. Airflow control apparatus 700 shown in FIG. 7 is similar to airflow control apparatus 100 shown in FIG. 4 without the plurality of doors 130 of FIG. 4. FIG. 7 shows each vane of a plurality of vanes 720 in an opened position.

Figure 8:
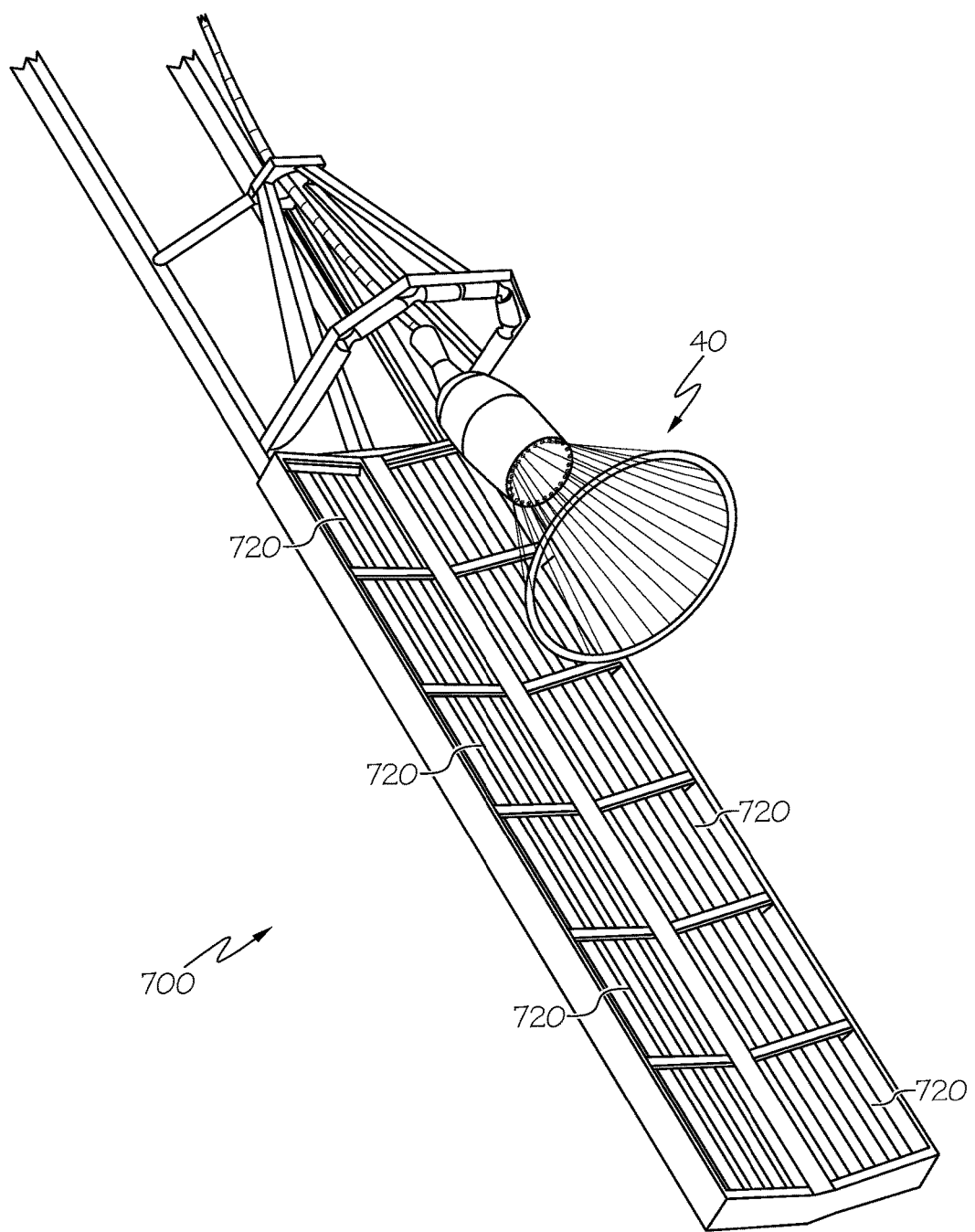
FIG. 8 is a perspective view similar to the perspective view of FIG. 7 from a slightly different angle, and showing controllable vanes fully closed and a coupling structure in a different position.

Referring to FIG. 8, a perspective view similar to the perspective view of FIG. 7 is illustrated. FIG. 8 shows each vane of the plurality of vanes 720 in a fully closed position. FIG. 8 also shows coupling structure 40 in a position that is even closer to airflow control apparatus 700 than shown in the position of FIG. 7. As coupling structure 40 moves closer to airflow control apparatus 700 from the position shown in FIG. 7 to the position shown in FIG. 8, each vane of the plurality of vanes 720 can be controlled to move anywhere between its fully opened position to its fully closed position. Each vane of the plurality of vanes 720 of FIG. 7 can be controlled in the same manner as each vane of the plurality of vanes 120 of FIG. 4 as already described hereinabove.

Figure 9:
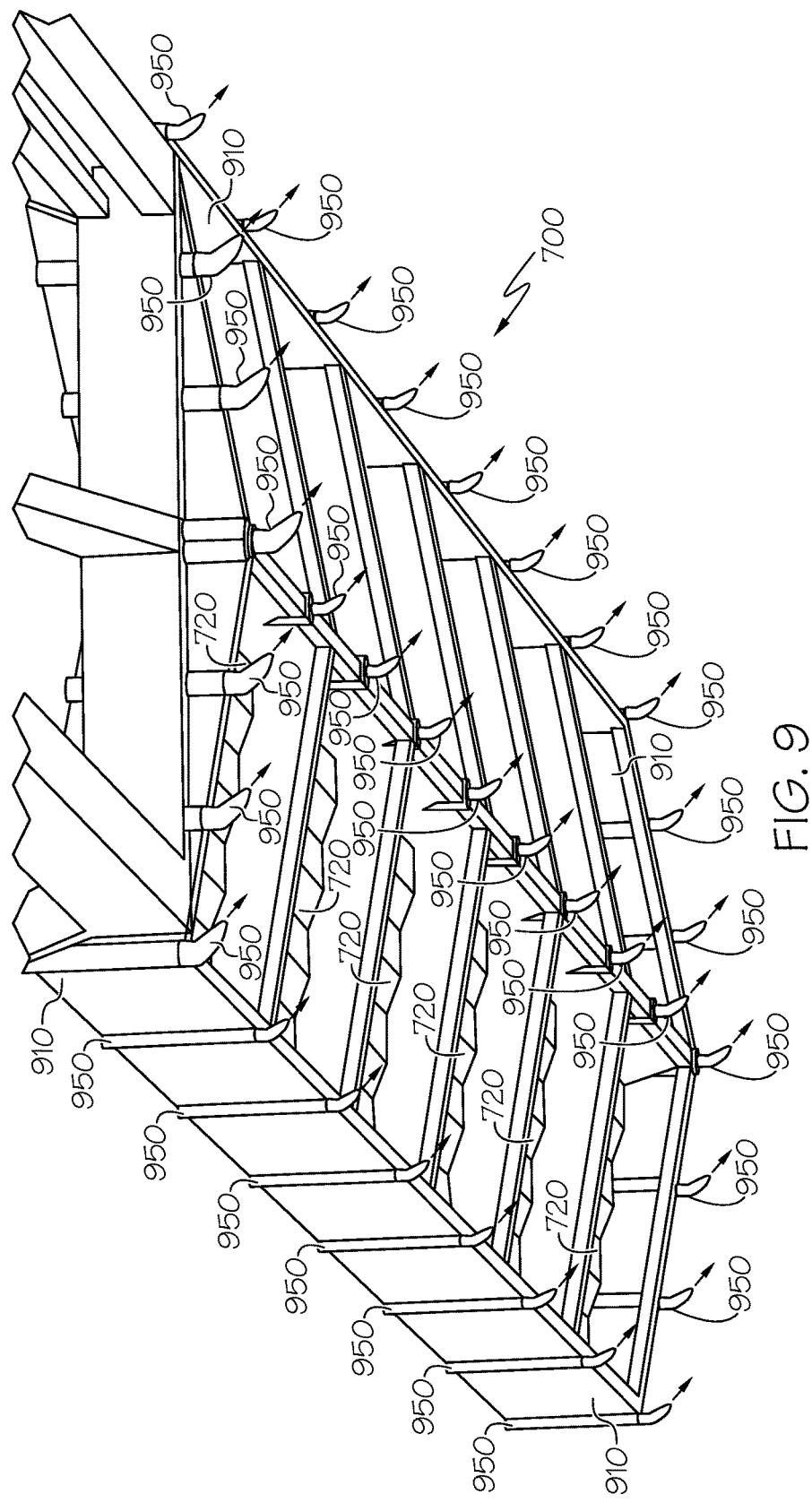
FIG. 9 is a perspective view, looking approximately out of the page of FIG. 8 and from the opposite side of the airflow control apparatus.

Referring to FIG. 9, a perspective view, looking approximately out of the page of FIG. 8 and from the opposite side of airflow control apparatus 700, is illustrated. FIG. 9 shows a plurality of controllable compressed air jets 950, and each vane of the plurality of vanes 720 of airflow control apparatus 700 of FIG. 7 in its fully closed position. Each jet of the plurality of controllable jets 950 is disposed on frame 910. Each jet of the plurality of controllable jets 950 comprises a nozzle from which air can be controllably expelled to provide a controlled airflow. Structure and operation of controllable compressed air jets are known and, therefore, will not be described.

As shown in FIG. 9, the direction of compressed air flow from a nozzle in a direction opposite to the direction of the incoming free-streaming flow. However, it is conceivable that direction of compressed air flow from a nozzle is in a direction other than opposite to the direction of the incoming free-streaming flow. Moreover, it is conceivable that some nozzles point in the direction opposite to the direction of the incoming free-streaming flow, and some nozzles point in a direction other than opposite to the direction of the incoming free-streaming flow. It is also conceivable that each nozzle points in a direction different from the directions of all of the other nozzles.

Each jet of the plurality of jets 950 is controllable to provide active airflow to dynamically modify the airflow behind the carrier aircraft and thereby to redirect air flow during the in-flight recovery of the UAV. Accordingly, the controlling of the plurality of jets 950 complements the controlling of the plurality of vanes 720 to dynamically modify the airflow behind the carrier aircraft and thereby to redirect air flow during the in-flight recovery of the UAV. It is conceivable that only the plurality of jets 950 (and not the plurality of vanes 720) be used to dynamically modify the airflow behind the carrier aircraft. Also, it is conceivable that only the plurality of vanes 720 (and not the plurality of jets 950) be used to dynamically modify the airflow behind the carrier aircraft.

Figure 10:
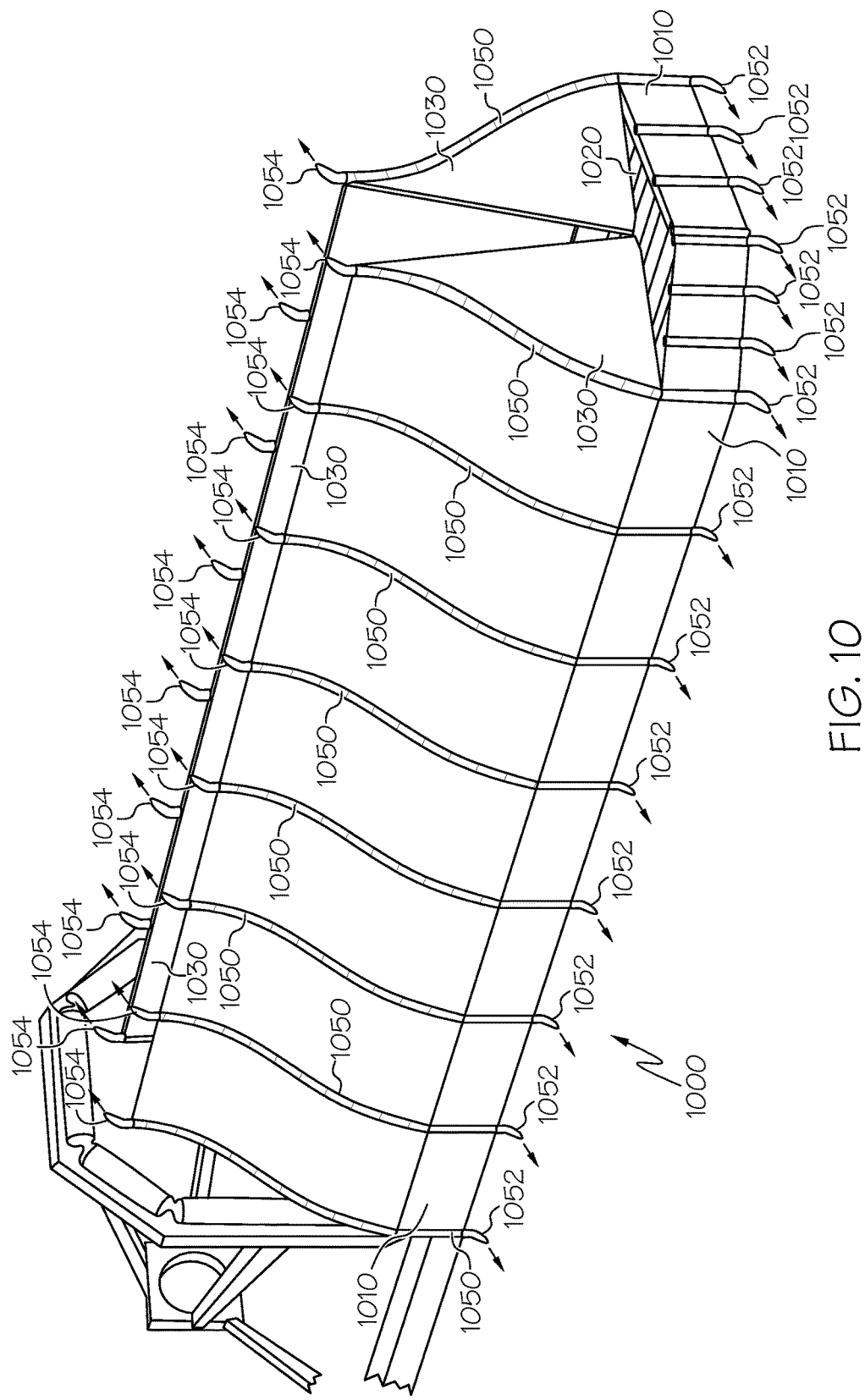
FIG. 10 is a perspective view of an example airflow control apparatus for dynamically controlling airflow behind a carrier aircraft, and constructed in accordance with still another embodiment.

Referring to FIG. 10, a perspective view of an example airflow control apparatus 1000 for dynamically controlling airflow behind a carrier aircraft, and constructed in accordance with still another embodiment, is illustrated. FIG. 10 shows jets of a plurality of controllable compressed air jets 1050 and vanes of a plurality of controllable vanes 1020 of airflow control apparatus 1000. Each jet of the plurality of controllable jets 1050 is disposed on frame 1010.

Each jet of the plurality of controllable jets 1050 is spaced apart along the lengthwise extent of frame 1010, and is contoured to an outer surface of a door of a plurality of doors 1030. Each jet of the plurality of controllable jets 1050 comprises a nozzle from which air can be controllable expelled to provide an active-controlled airflow. Structure and operation of controllable compressed air jets are known and, therefore, will not be described.

The plurality of controllable jets 1050 includes a lower set 1052 of jets and an upper set 1054 of jets. The lower set 1052 of jets points in a direction opposite to the direction of the incoming free-streaming flow. The upper set 1054 of jets points in the same direction as the direction of the incoming free-streaming flow. However, it is conceivable that direction of compressed air flow from any nozzle can be in a direction other than opposite to the direction of the incoming free-streaming flow or in the same direction of the incoming free-streaming flow. Moreover, it is conceivable that each nozzle points in a direction different from the directions of all of the other nozzles.

Each jet of the plurality of controllable jets 1050 is controlled to provide active airflow to dynamically modify the airflow behind the carrier aircraft and thereby to redirect air flow during the in-flight recovery of the UAV. Accordingly, the controlling of the plurality of jets 1050 complements the controlling of the plurality of vanes 1020 to dynamically modify the airflow behind the carrier aircraft and thereby to redirect air flow during the in-flight recovery of the UAV. It is conceivable that only the plurality of jets 1050 (and not the plurality of vanes 1020) be used to dynamically modify the airflow behind the carrier aircraft. Also, it is conceivable that only the plurality of vanes 1020 (and not the plurality of jets 1050) be used to dynamically modify the airflow behind the carrier aircraft.

Referring to FIG. 11, an elevational view of an example airflow control apparatus 1100 for dynamically controlling airflow behind a carrier aircraft, and constructed in accordance with yet another embodiment, is illustrated. FIG. 12 is an elevational view, looking approximately in the direction of arrow "12" in FIG. 11, and shows each vane of a plurality of controllable, arcuate-shaped vanes 1220 in a closed position. Each of the plurality of arcuate-shaped vanes 1220 is disposed in four quadrants of circular-shaped frame 1110.

Controllable compressed air jets, such as described hereinabove with reference to other embodiments, can be used in the embodiment of FIGS. 11 and 12. For example, jets of a plurality of jets 1150 shown in FIG. 12 can be actively controlled to complement the controlling of arcuate-shaped vanes 1220. It is conceivable that only the plurality of jets 1150 (and not the plurality of vanes 1220) be used to dynamically modify the airflow behind the carrier aircraft. Also, it is conceivable that only the plurality of vanes 1220 (and not the plurality of jets 1150) be used to dynamically modify the airflow behind the carrier aircraft.

Referring to FIG. 13, an elevational view similar to the perspective view of FIG. 12 shows each vane of the plurality of controllable, radial-shaped vanes 1320 in a closed position in accordance with another embodiment. Each vane of the plurality of radial-shaped vanes 1320 is disposed in circular-shaped frame 1310.

Controllable compressed air jets, such as described hereinabove with reference to other embodiments, can be used in the embodiment of FIG. 13. For example, jets of a plurality of jets 1350 shown in FIG. 13 can be actively controlled to complement the controlling of radial-shaped vanes 1320. It is conceivable that only the plurality of jets 1350 (and not the plurality of vanes 1320) be used to dynamically modify the airflow behind the carrier aircraft. Also, it is conceivable that only the plurality of vanes 1320 (and not the plurality of jets 1350) be used to dynamically modify the airflow behind the carrier aircraft.

Although the above description described using arcuate-shaped vanes 1220 (FIGS. 11 and 12) or radial-shaped vanes 1320 (FIG. 13), it is conceivable that any combination of arcuate-shaped vanes or radial-shaped vanes may be used together.

Figure 14:
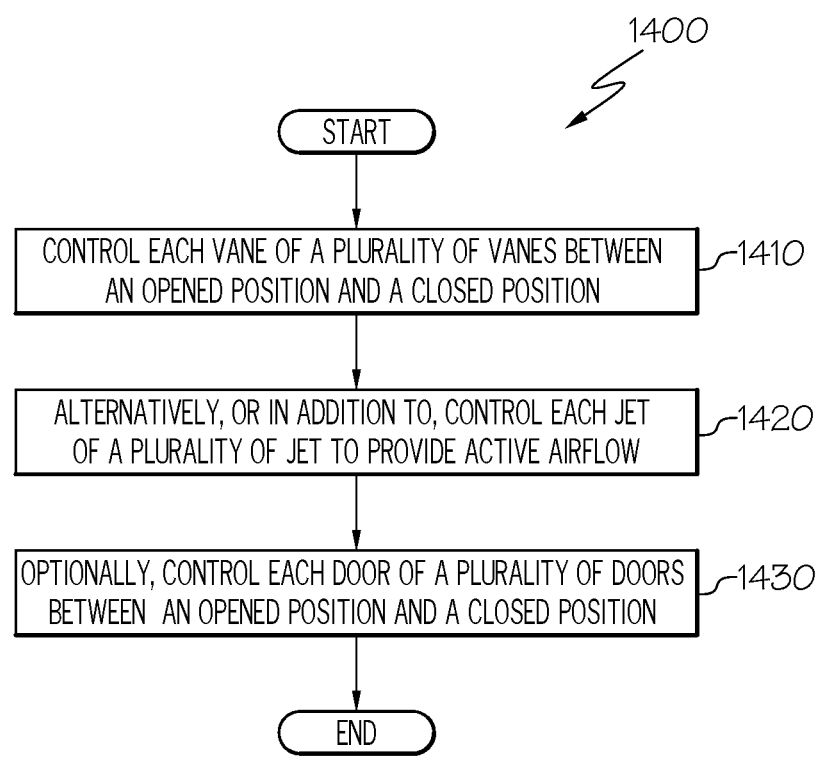
FIG. 14 is a flow diagram depicting a method of dynamically controlling airflow behind a carrier aircraft in accordance with an embodiment.

Referring to FIG. 14, flow diagram 1400 depicts an example method of dynamically controlling airflow behind a carrier aircraft in accordance with an embodiment. In block 1410, each vane of a plurality of vanes is controlled between an opened position and a closed position to dynamically modify the airflow behind the carrier aircraft during an in-flight recovery of a UAV. In block 1420, alternatively, or in addition to, each jet of a plurality of compressed air jets is controlled to provide active airflow to dynamically modify the airflow behind the carrier aircraft during the in-flight recovery of the UAV. In block 1430, optionally, each door of a plurality of doors is controlled between an opened position and a closed position to dynamically modify the airflow behind the carrier aircraft during the in-flight recovery of the UAV.

Figure 15A:
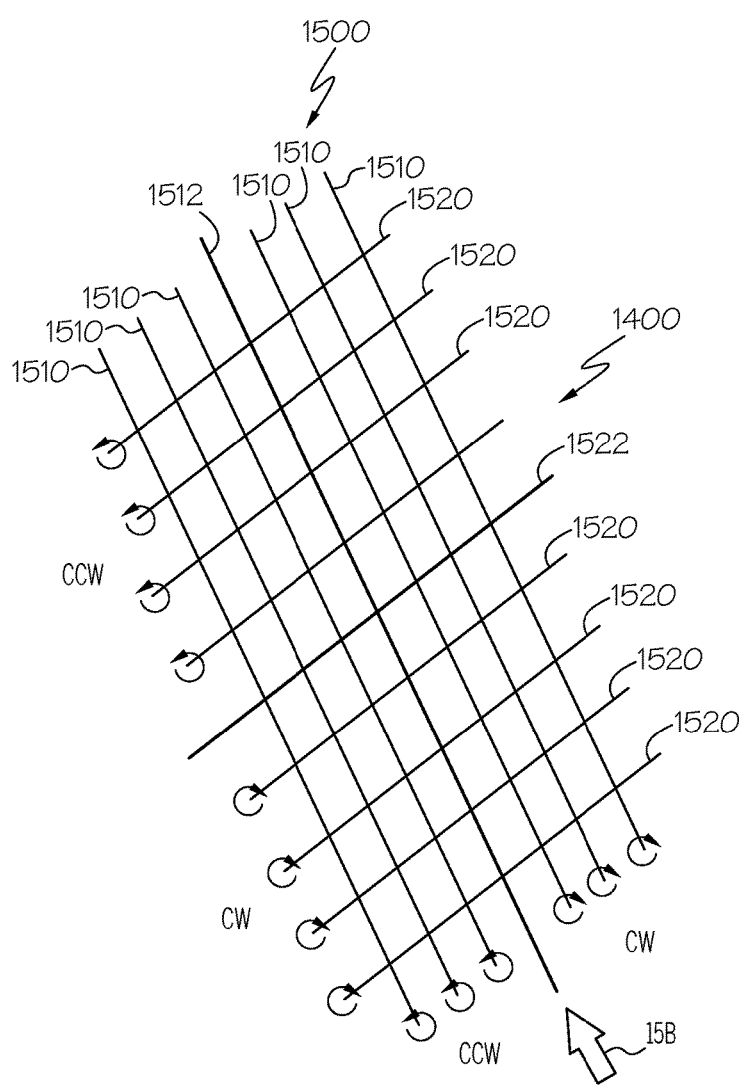
FIG. 15A is a schematic view of an example airflow control apparatus including two stacked layers of controllable vanes in accordance with an embodiment.

Referring to FIG. 15A, a schematic view of an example airflow control apparatus 1500 including a first layer 1510 of controllable vanes and a second layer 1520 of controllable vanes (i.e., stacked layers) in accordance with an embodiment is illustrated. For simplicity, vanes of the first and second layers 1510, 1520 of controllable vanes are schematically shown in FIG. 15A as sticks, and other components such as a frame are omitted.

Vanes of first layer 1510 of controllable vanes and vanes of second layer 1520 of controllable vanes are perpendicular to each other. As shown in FIG. 15A, some vanes of first layer 1510 are rotatable in the clockwise direction, and some vanes of first layer 1510 are rotatable in the counter-clockwise direction. Similarly, some vanes of second layer 1520 are rotatable in the clockwise direction, and some vanes of second layer 1520 are rotatable in the counter-clockwise direction.

In FIG. 15A, the incoming freestream flow direction is perpendicular to the plane in which vanes of the first layer 1510 and vanes of the second layer 1520 lie. In this particular example, vanes of first layer 1510 of controllable vanes control airflow in side-to-side directions, and vanes of second layer 1520 of controllable vanes control airflow in up-and-down directions. However, it is conceivable that the incoming freestream flow direction may be from any direction relative to the plane in which vanes of the first and second layers 1510, 1520 lie. For simplicity, the incoming freestream flow direction that is perpendicular to the plane in which vanes of the first and second layers 1510, 1520 is described herein.

Vanes of first layer 1510 includes center vanes 1512, and vanes of second layer 1512 include center vanes 1522. Structure and operation of center vanes 1512 of first layer 1510 and center vanes 1522 of second layer 1520 are the same. For simplicity, structure and operation of only center vanes 1512 of first layer 1510 are discussed herein.

Figure 15B:
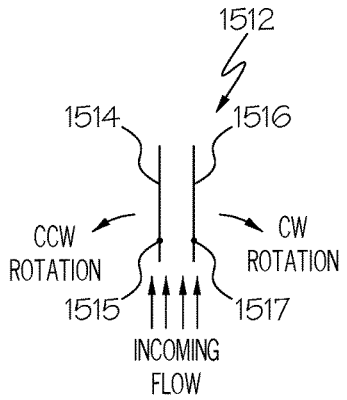
FIG. 15B is a schematic view of center vanes of a layer of the controllable vanes shown in FIG. 15A, looking approximately in the direction of arrow "15B" shown in FIG. 15A.

Referring FIG. 15B, a schematic view of center vanes 1512 of first layer 1510 shown in FIG. 15A, looking approximately in the direction of arrow "15B" shown in FIG. 15A, is illustrated. Center vanes 1512 include first vane 1514 pivotable about first hinge 1515 that can be anchored to a frame (not shown). Center vanes 1512 also include second vane 1516 pivotable about second hinge 1517 that can be anchored to the frame.

As shown in FIG. 15B, each of first vane 1514 and second vane 1516 is in a fully opened position. Each of first and second vanes 1514, 1516 lie in a plane parallel to the incoming freestream flow direction. First vane 1514 is pivotable counter-clockwise about first hinge 1515 from its fully opened position shown in FIG. 15B to a fully closed position. Similarly, second vane 1516 is pivotable clockwise about second hinge 1517 from its fully opened position shown in FIG. 15B to a fully closed position.

Figure 15C:
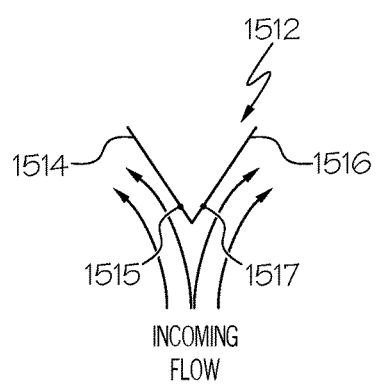
FIG. 15C is a schematic view similar to the schematic view of FIG. 15B, and showing the center vanes in a different position.

Referring to FIG. 15C, a schematic view similar to the schematic view of FIG. 15B, and showing each of first and second vanes 1514, 1516 in a different position. More specifically, first vane 1514 is rotated counter-clockwise to a partially opened position to deflect the incoming free-streaming flow to the left (as viewed looking at FIG. 15C). Similarly, second vane 1516 is rotated clockwise to a partially opened position to deflect the incoming free-streaming flow to the right.

It should also be apparent that an array of controlled louvers and wing-type flaps are provided to generate a managed field of airflow behind a leading aircraft. Alternatively, or in addition to, an array of controlled compressed air jets is provided to generate a managed field of airflow behind a leading aircraft. The field of airflow is dynamically controlled to selectively create a flow bubble that eases a trailing aircraft to be recovered by the leading aircraft into a specific position or onto a recovery carriage.

It should also be apparent that the dynamically adjustable field of airflow behind the leading aircraft provides more predictable and more stable operations of the trailing aircraft as required during an in-flight recovery of the trailing vehicle. The ability to dynamically control a field of airflow behind the leading aircraft alleviates unpredictable behaviors, especially in the presence of external turbulence caused by the leading aircraft, weather, and other effects.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although various aspects of disclosed embodiments have been shown and described, modifications may occur to those skilled in the art upon reading the specification. The present application includes such modifications and is limited only by the scope of the claims.

What is claimed is:

1. An apparatus for dynamically controlling airflow behind a carrier aircraft to redirect air flow during an in-flight recovery of an unmanned aerial vehicle (UAV), the apparatus comprising:
   an airflow control apparatus comprising:
      a frame attached to an end portion of an arm member extending from the carrier aircraft; and
      a plurality of vanes disposed within the frame, wherein each vane is controllable between an opened position and a closed position to dynamically modify the airflow behind the carrier aircraft during the in-flight recovery of the UAV;
   a tether extending from the carrier aircraft and through the airflow control apparatus: and
   a coupling structure attached proximate an end of the tether, wherein the coupling structure is retractable relative to the airflow control apparatus by way of the tether.

2. The apparatus according to claim 1, further comprising:
   a plurality of compressed air jets disposed on the frame, wherein each jet is controllable to provide active airflow to dynamically modify the airflow behind the carrier aircraft during the in-flight recovery of the UAV.

3. The apparatus according to claim 1, further comprising:
   a plurality of doors disposed on the frame, wherein each door is controllable between an opened position and a closed position to dynamically modify the airflow behind the carrier aircraft during the in-flight recovery of the UAV.

4. The apparatus according to claim 1, further comprising:
   a plurality of jets disposed on the frame, wherein each jet is controllable to provide active airflow to dynamically modify the airflow behind the carrier aircraft during the in-flight recovery of the UAV; and
   a plurality of doors disposed on the frame, wherein each door is controllable between an opened position and a closed position to dynamically modify the airflow behind the carrier aircraft during the in-flight recovery of the UAV.

5. The apparatus according to claim 1, wherein (i) the frame is rectangular-shaped, and (ii) at least some of the plurality of vanes are rectangular-shaped.

6. The apparatus according to claim 1, wherein (i) the frame is circular-shaped, and (ii) at least some of the plurality of vanes are arcuate-shaped.

7. The apparatus according to claim 1, wherein (i) the frame is circular-shaped, and (ii) at least some of the plurality of vanes are radial-shaped.

8. An apparatus for dynamically controlling airflow behind a carrier aircraft to redirect air flow during an in-flight recovery of an unmanned aerial vehicle (UAV), the apparatus comprising:
   an airflow control apparatus comprising:
      a frame attached to an end portion of an arm member extending from the carrier aircraft; and
      a plurality of compressed air jets disposed on the frame, wherein each jet is controllable to provide active airflow to dynamically modify the airflow behind the carrier aircraft during the in-flight recovery of the UAV;
   a tether extending from the carrier aircraft and through the airflow control apparatus: and
   a coupling structure attached proximate an end of the tether, wherein the coupling structure is retractable relative to the airflow control apparatus by way of the tether.

9. The apparatus according to claim 8, wherein the frame is rectangular-shaped.

10. The apparatus according to claim 9, further comprising:
   a plurality of rectangular-shaped vanes disposed within the rectangular-shaped frame, wherein each rectangular-shaped vane is controllable between an opened position and a closed position to dynamically modify the airflow behind the carrier aircraft during the in-flight recovery of the UAV.

11. The apparatus according to claim 10, further comprising:
   a plurality of rectangular-shaped doors disposed on the rectangular-shaped frame, wherein (i) each rectangular-shaped door is controllable between an opened position and a closed position to dynamically modify the airflow behind the carrier aircraft during the in-flight recovery of the UAV, and (ii) the doors of the plurality of rectangular-shaped doors secure the UAV in all six degrees of freedom after the UAV has landed and each of the doors is in the closed position.

12. The apparatus according to claim 8, wherein the frame is circular-shaped.

13. The apparatus according to claim 12, further comprising:
a plurality of arcuate-shaped vanes disposed within the circular-shaped frame, wherein each arcuate-shaped vane is controllable between an opened position and a closed position to dynamically modify the airflow behind the carrier aircraft during the in-flight recovery of the UAV.

14. The apparatus according to claim 12, further comprising:
a plurality of radial-shaped vanes disposed within the circular-shaped frame, wherein each radial-shaped vane is controllable between an opened position and a closed position to dynamically modify the airflow behind the carrier aircraft during the in-flight recovery of the UAV.

15. A method of dynamically controlling airflow behind a carrier aircraft to redirect air flow during an in-flight recovery of an unmanned aerial vehicle (UAV), the method comprising:
extending an airflow control apparatus from the carrier aircraft, the airflow control apparatus comprising a plurality of vanes;
extending a coupling structure from the airflow control apparatus;
interlocking the extended coupling structure with the UAV;
pulling the coupling structure interlocked with the UAV toward the airflow control apparatus; and
during the pulling step, controlling each vane of the plurality of vanes between an opened position and a closed position to dynamically modify the airflow behind the carrier aircraft during the in-flight recovery of the UAV.

16. The method according to claim 15, further comprising:
controlling each jet of a plurality of compressed air jets to provide active airflow to dynamically modify the airflow behind the carrier aircraft during the in-flight recovery of the UAV.

17. The method according to claim 15, further comprising:
controlling each door of a plurality of doors between an opened position and a closed position to dynamically modify the airflow behind the carrier aircraft during the in-flight recovery of the UAV.

18. The method according to claim 15, wherein the method is performed by a computer having a memory executing one or more programs of instructions which are tangibly embodied in a program storage medium readable by the computer.

19. A method of dynamically controlling airflow behind a carrier aircraft to redirect air flow during an in-flight recovery of an unmanned aerial vehicle (UAV), the method comprising:
extending an airflow control apparatus from the carrier aircraft, the airflow control apparatus comprising a plurality of compressed air jets;
extending a coupling structure from the airflow control apparatus;
interlocking the extended coupling structure with the UAV;
pulling the coupling structure interlocked with the UAV toward the airflow control apparatus; and
during the pulling step, controlling each jet of the plurality of compressed air jets to provide active airflow to dynamically modify the airflow behind the carrier aircraft during the in-flight recovery of the UAV.

20. The method according to claim 19, wherein the method is performed by a computer having a memory executing one or more programs of instructions which are tangibly embodied in a program storage medium readable by the computer.

* * * * *